United States Patent
Fang et al.

(10) Patent No.: US 6,349,205 B1
(45) Date of Patent: Feb. 19, 2002

(54) METHOD FOR CONVERTING AN EXISTING SUBSCRIBER TO A WIRELESS COMMUNICATIONS SYSTEM

(75) Inventors: I-Ning Hsu Fang, Singapore (SG); Peng-Sheng Ku, Naperville, IL (US); Jason Cheng Ting, Taipei (TW); Bee Yun Yu, Morristown, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/292,238

(22) Filed: Apr. 15, 1999

(51) Int. Cl.[7] ................................................. H04M 3/42
(52) U.S. Cl. ........................ 455/419; 455/426; 455/552; 455/414
(58) Field of Search .................................. 455/406, 410, 455/411, 414, 418, 419, 433, 435, 552, 553, 426

(56) References Cited

U.S. PATENT DOCUMENTS 5,898,922 A * 4/1999 Reininghaus ................ 455/433

FOREIGN PATENT DOCUMENTS

| EP | 0889661 A2 | 1/1999 | ............ H04Q/7/32 |
|----|----|----|----|
| WO | WO9501069 | 1/1995 | ............ H04Q/7/04 |
| WO | WO9523487 | 8/1995 | ............ H04Q/7/22 |
| WO | WO9849848 | 11/1998 | ............ H04Q/7/20 |
| WO | WO9849860 | 11/1998 | ............ H04Q/7/38 |

* cited by examiner

*Primary Examiner*—Lee Nguyen
(74) *Attorney, Agent, or Firm*—Alston & Bird LLP

(57) ABSTRACT

A subscriber conversion system determines at least one code for an existing subscriber of a first wireless communications system to be converted to a second wireless communications system. When the existing subscriber obtains a wireless unit to be used in the second wireless communications system, the conversion system uses the at least one code provided to the existing subscriber to link existing subscriber information from the first wireless communications system to information associated with wireless unit for the second communications system, thereby improving the efficiency of the conversion process. For example, if a service provider wishes to convert from GSM to CDMA, the service provider can provide a secret code and an identification number, such as a directory number (DN), as the codes to the existing GSM subscriber. The subscriber obtains a CDMA wireless unit and commences an activation process to activate the CDMA wireless unit. As part of the activation process, the subscriber provides the secret code and the identification number to the conversion system. The conversion system determines if the secret code and the identification number correspond to the secret code and identification number provided to an existing GSM subscriber. If so, information which is characteristic of the CDMA wireless unit, such as the ESN, DN and/or IMSI, is associated with at least a portion of existing GSM subscriber information, such as billing information and/or features or services. As such, the conversion system uses existing subscriber information to reduce the time required to convert the existing subscriber to the wireless communications system based on the second radio standard.

20 Claims, 3 Drawing Sheets

METHOD FOR CONVERTING AN EXISTING SUBSCRIBER TO A WIRELESS COMMUNICATIONS SYSTEM

BACKGROUND OF THE INVENTION

1. Field of The Invention

This invention relates to wireless communications and, more particularly, to a system for converting an existing subscriber of a first wireless communications system to a second wireless communications system.

2. Description of Related Art

FIG. 1 depicts a schematic diagram of a wireless communications system 10 which provide wireless communications service to a number of wireless units (e.g., wireless units 12a–c) that are situated within geographic regions 14 and 16. A Mobile Switching Center (e.g. MSCs 20 and 24) is responsible for, among other things, establishing and maintaining calls between the wireless units and calls between a wireless unit and a wireline unit (e.g., wireline unit 25). As such, the MSC interconnects the wireless units within its geographic region with a public switched telephone network (PSTN) 28. The geographic area serviced by the MSC is divided into spatially distinct areas called "cells." As depicted in FIG. 1, each cell is schematically represented by one hexagon in a honeycomb pattern; in practice, however, each cell has an irregular shape that depends on the topography of the terrain surrounding the cell. Typically, each cell contains a base station (e.g. base stations 22a–e and 26a–e), which comprises the radios and antennas that the base station uses to communicate with the wireless units in that cell. The base stations also comprise the transmission equipment that the base station uses to communicate with the MSC in the geographic area. For example, MSC 20 is connected to the base stations 22a–e in the geographic area 14, and an MSC 24 is connected to the base stations 26a–e in the geographic region 16. Within a geographic region, the MSC switches calls between base stations in real time as the wireless unit moves between cells, referred to as call handoff.

The MSCs 20 and 24 use a signaling network 32, which enables the exchange of information about the wireless units within the respective geographic areas 14 and 16, for location validation and call delivery to wireless units which are roaming in other geographic areas. For example, a wireless unit 12a is roaming when the wireless unit 12a leaves the geographic area 14 of the MSC 20 to which it was originally assigned (e.g. home MSC). To ensure that a roaming wireless unit can receive a call, the roaming wireless unit 12a registers with the MSC 24 in which it presently resides (e.g., the visitor MSC) by notifying the visitor MSC 24 of its presence. Once a roaming wireless unit 12a is identified by a visitor MSC 24, the visitor MSC 24 sends a registration request to the home MSC 20 over the signaling network 32, and the home MSC 20 updates a database 34, referred to as the home location register (HLR), with the identification of the visitor MSC 24, thereby providing the location of the roaming wireless unit 12a to the home MSC 20.

The HLR 34 contains subscriber information and location information for all wireless units which reside in the geographic area 14 of the MSC 20. The HLR 34 includes a mobile identification number (MIN) or International Mobile Subscriber Identification Number (IMSI), the mobile directory number (MDN), and/or an electronic serial number (ESN) for each of the wireless units. An authentication center (AC) 35 authenticates a wireless unit by using the MIN/IMSI and ESN of the wireless unit and data stored in the HLR 34. After a roaming wireless unit is authenticated, the home MSC 20 provides to the visitor MSC 24 a customer profile which indicates the features available to the roaming wireless unit, such as call waiting, caller id, call forwarding, three-way calling, and international dialing access. Upon receiving the customer profile, the visitor MSC 24 updates a database 36, referred to as the visitor location register (VLR), to provide the same features as the home MSC 20. The HLR, VLR and/or the AC can be co-located at the MSC or remotely accessed.

There are different radio standards for wireless cellular communications systems which determine how a wireless unit communicates within the wireless communications system 10 or variations of the wireless architecture thereof. The different radio standards include wireless communications systems using code division multiple access (CDMA), Advanced Mobile Phone System (AMPS), Global System Mobile (GSM), North American time division multiple access (North American TDMA), Total Access Cellular System (TACS), European Total Access Cellular System (ETACS) and others. These wireless cellular communications systems have evolved from first generation analog systems based on frequency modulated (FM) voice technology, such as AMPS, to second generation digital systems, such as wireless cellular communications systems based on CDMA, TDMA and GSM. The first generation systems had limited capacity. The second generation systems provide increased capacity and service capabilities. For example, the second generation systems are being networked to provide seamless roaming, call delivery and handoff services on a national and international basis. Third generation wireless cellular systems are evolving from second generation systems which provide improved access to voice and data networks. Certain radio standards, such as CDMA, are recognized as being well suited for implementing third generation wireless systems.

In this environment of evolving wireless communications systems, wireless service providers may change or convert the service provider's wireless communications system to a different standard, such as CDMA, which more readily supports implementing third generation wireless systems. To do so, the service provider typically asks the existing subscribers to go to a store or outlet to select a new wireless unit for the new wireless communications system. After selecting the wireless unit, the existing subscriber calls a customer registration service 38 using the new wireless unit to activate the new wireless unit and get a phone number (DN) and/or a new IMSI. A human operator at the customer service 38 asks for subscriber information, such as billing information and features or services desired by the existing subscriber. The operator inputs the new subscriber information into a database in the customer service 38, and the customer service 38 assigns a DN and/or new IMSI to the new wireless unit. The new wireless unit already has the ESN and a dummy International Mobile Subscriber Identification number (IMSI). An over the air service provisioning process (OTASP) programs the DN and/or the IMSI into the new wireless unit using an over the air function (OTAF) 40 which allows the IMSI and/or DN to be programmed into the new wireless unit. The activation process provides the new subscriber information at the customer service 38, including the DN, IMSI, billing information and/or services, to the HLR 34 of the home MSC 20. Once the home MSC 20 has the subscriber information or customer profile in its HLR 34, the new wireless unit is activated.

The OTASP process was designed for new subscribers, and the process takes about 20–25 minutes to activate a wireless subscription. If the service provider informs all existing subscribers to exchange an existing handset for a new handset to support the new radio standard, it is difficult to predict the numbers of operators required to handle the conversion of the existing subscribers from the previous wireless communications system to the new wireless communications system using the new radio standard. As such, subscribers may be required to wait excessive periods of time for an operator to answer the call and process the activation procedure for the subscriber's new wireless unit. Moreover, during the conversion period, the service provider will be exposed to increased costs, for example due to increased staffing and training, and may dissatisfy existing subscribers. Thus, a conversion system is required to reduce the problems associated with converting an existing subscriber for a first wireless communications system to a second wireless communications system.

SUMMARY OF TIME INVENTION

The present invention involves a subscriber conversion system which determines at least one code for an existing subscriber of a first wireless communications system to be converted to a second wireless communications system. When the existing subscriber obtains a wireless unit to be used in the second wireless communications system, the conversion system uses the at least one code provided to the existing subscriber to link existing subscriber information from the first wireless communications system to information associated with wireless unit for the second communications system, thereby improving the efficiency of the conversion process. For example, if a service provider wishes to convert from GSM to CDMA, the service provider can provide a secret code and an identification number, such as a directory number (DN), as the codes to the existing GSM subscriber. The subscriber obtains a CDMA wireless unit and commences an activation process to activate the CDMA wireless unit. As part of the activation process, the subscriber provides the secret code and the identification number to the conversion system. The conversion system determines if the secret code and the identification number correspond to the secret code and identification number provided to an existing GSM subscriber. If so, information which is characteristic of the CDMA wireless unit, such as the ESN, DN and/or IMSI, is associated with at least a portion of existing GSM subscriber information, such as billing information and/or features or services. As such, the conversion system uses existing subscriber information to reduce the time required to convert the existing subscriber to the wireless communications system based on the second radio standard.

BRIEF DESCRIPTION OF THE DRAWINGS

Other aspects and advantages of the present invention may become apparent upon reading the following detailed description and upon reference to the drawings in which.

DETAILED DESCRIPTION

Figure 1:
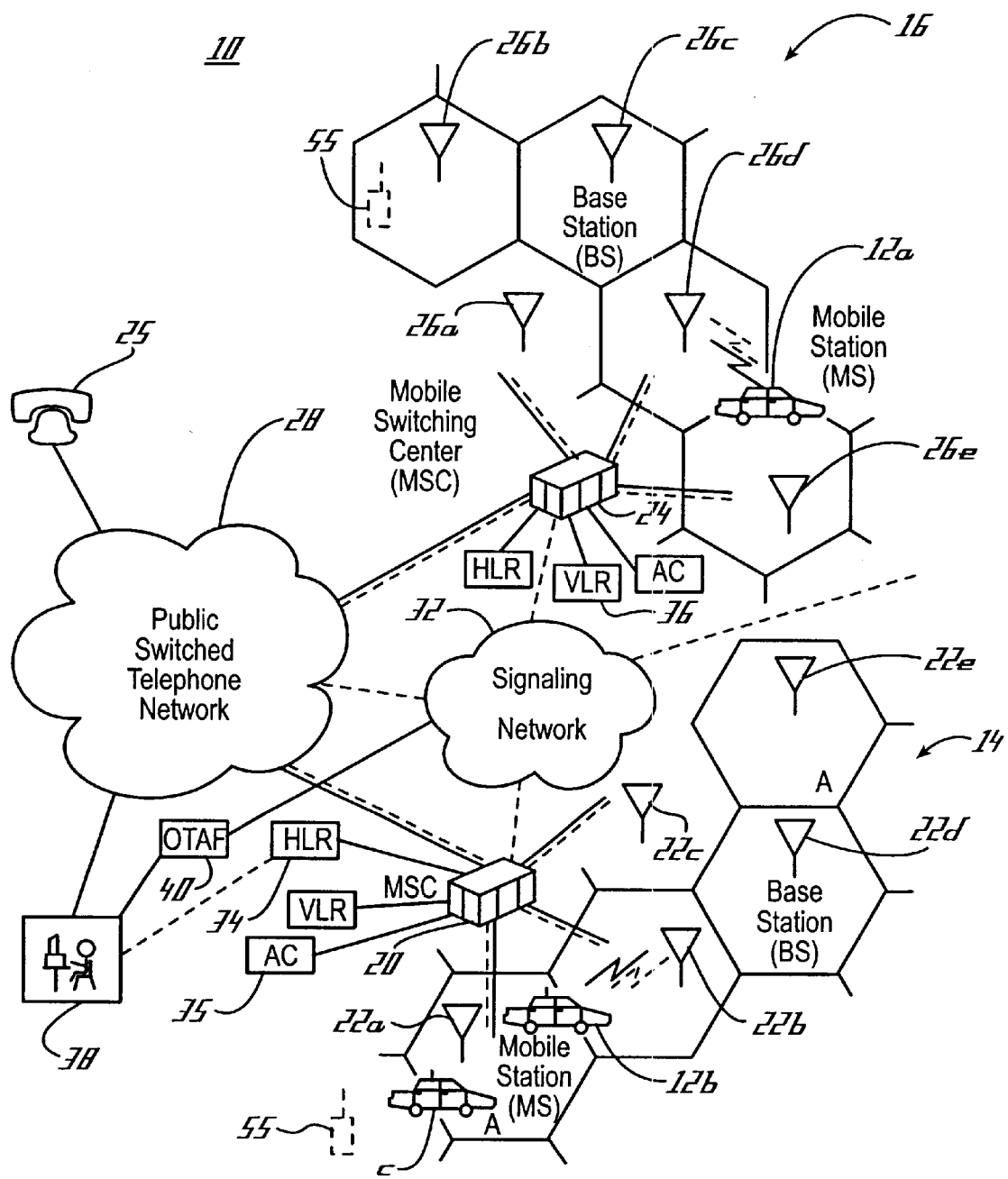
FIG. 1 shows a general diagram of a wireless communications system.

An illustrative embodiment of a subscriber conversion system according to the principles of the present invention is described below. With particular reference to FIG. 1, a wireless service provider desires to convert existing subscribers of the first wireless communications system to a second wireless communications system 10. In this embodiment, the first wireless communications system can provide coverage for the same geographic regions 14 and/or 16 as the second wireless communications system 10. The first wireless communications system is based on a first radio standard ("first wireless communications system"), such as GSM, and the second wireless communications system is based on a second radio standard ("second wireless communications system"), such as CDMA. The first wireless communications system will typically have an architecture similar to that of the wireless system 10. As the first wireless communications system is transitioning to the second wireless communications system 10, existing subscriber information for the first wireless communications system can be stored in locations corresponding to those in the second wireless communications system 10 and/or different locations. The service provider provides the existing subscriber information to the subscriber conversion system for conversion to a format which the second wireless communications system 10 can use in converting the existing subscriber to the second wireless communications system 10.

Alternatively, portions of the wireless communications system 10 could use the first wireless communications system while portions use the second wireless communications system while the service provider is converting to the second wireless communications system for the wireless communications system 10. Moreover, in the wireless communications system 10, the geographic regions 14 and/or 16 could be under the control of the same or different service providers. Additionally, the wireless communications system 10 could be converted from the first to the second wireless communications system by geographic region of the wireless communications system 10. Other embodiments are possible on how the first wireless communications system is transitioned to the second wireless communications system using the wireless communications system 10 and/or additional wireless communications infrastructure which can eventually be converted to the second wireless communications system 10.

Figure 2A:
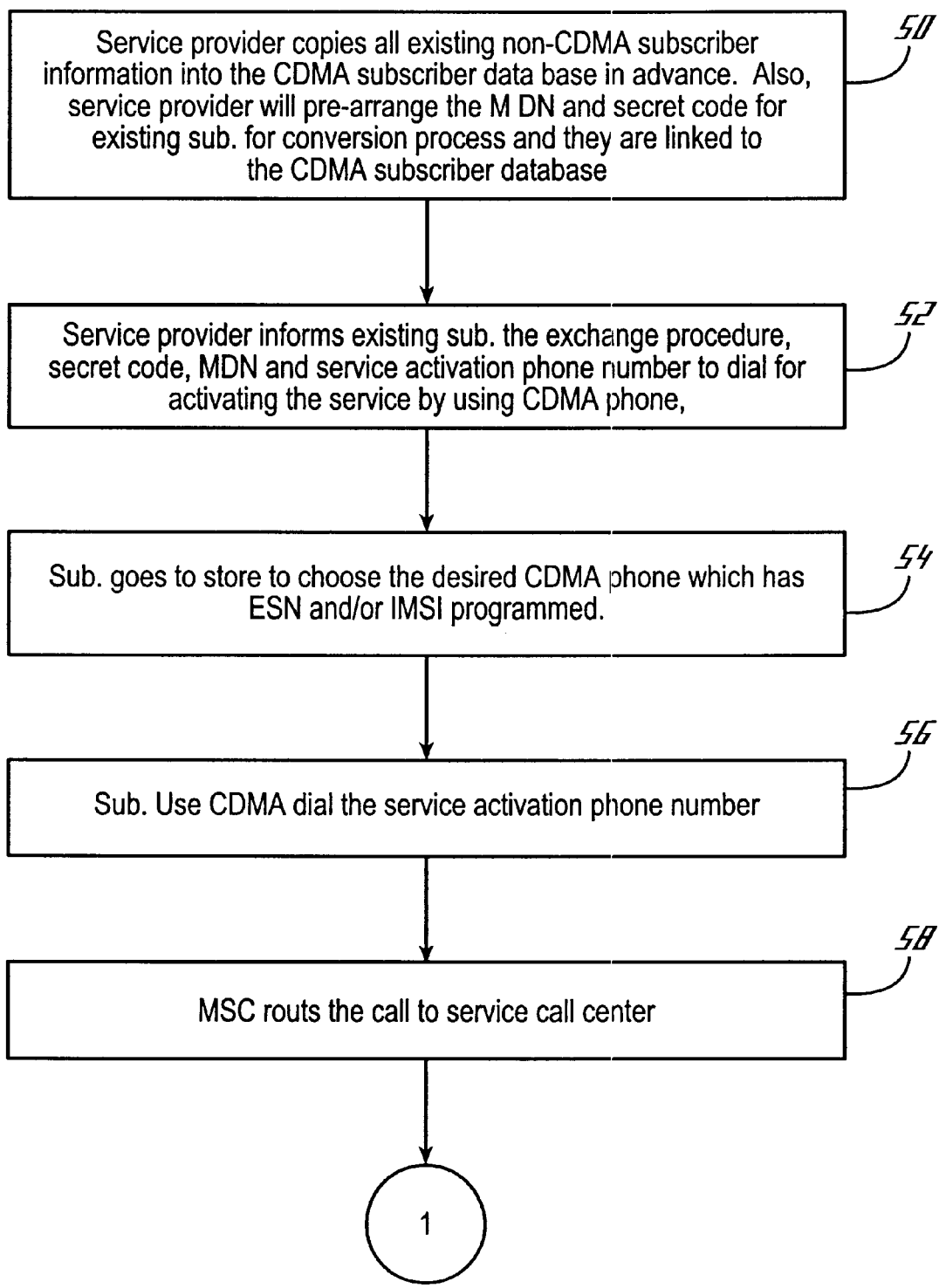
FIGS. 2a–b show a flow diagram showing an embodiment of the conversion system according to the principles of the present invention.
Figure 2B:
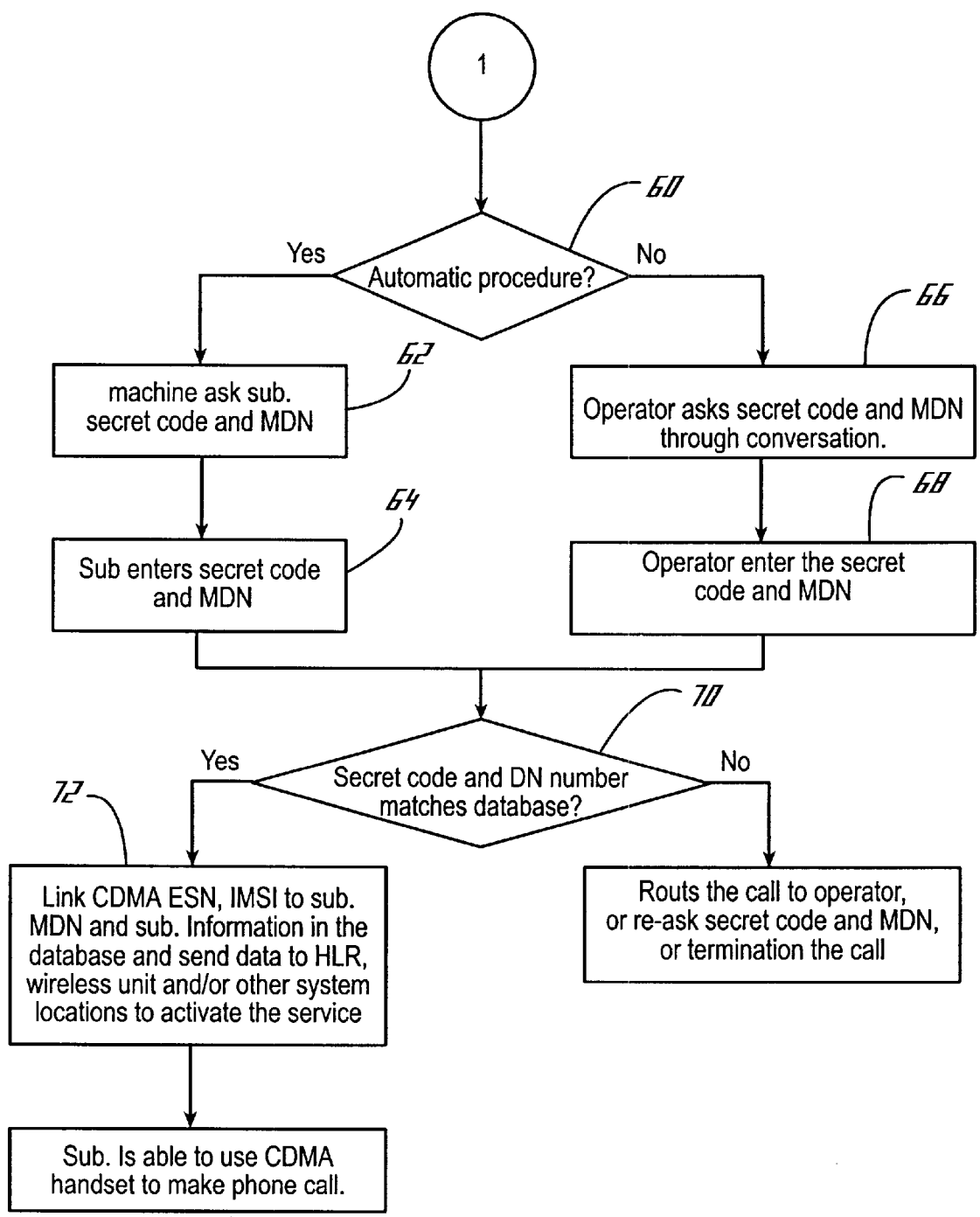

To convert existing subscribers of the first communications system to the second communications system as shown in FIGS. 2a and b, the service provider copies or provides existing subscriber information, such as billing information and/or service and features, from the first wireless communications system to convert the existing subscribers to the second wireless communications systems as shown in block 50. The service provider can copy all existing subscriber data, such as non-CDMA subscriber information, into a database or other storage location and convert the existing subscriber data into a form suitable for the second wireless communications system, such as CDMA subscriber data. A subscriber database for the wireless communications system using the first radio standard can transfer a copy of at least a portion of the existing subscriber information to a subscriber or conversion database in the customer service block 38 for the wireless communications system using the second radio standard. The existing subscriber information for the first wireless communications system can be obtained from different locations, for example from the HLRs of the first wireless communications system and/or from the subscriber database for the first wireless communications system.

The service provider determines a secret code, an identification number, and/or a set of identification numbers for each existing subscriber to be converted. In this embodiment, the service provider provides a secret cod and an identification number, such as a phone or directory number (DN). The secret code and identification number is associated with the corresponding existing subscriber information, for example in a conversion database for the second wireless communications system. The conversion database can be a part of or integrated with a subscriber database for the second wireless communications system. The conversion database could also be spread out to various locations. As such, the conversion database can be any storage locations accessible to the conversion system for the second wireless communications system and used to store, the secret code, the identification number, and/or subscriber information produced or derived from the existing subscriber's subscription with the first wireless communications system.

In this embodiment, after the conversion system has arranged the existing subscriber information with the secret code and identification number for the existing subscribers to be converted, the service provider informs the existing subscribers of the conversion. In doing so, the service provider provides the existing subscribers to be converted with the secret code and the identification number. In one embodiment, as shown in block 52, the service provider sends a letter to the existing subscribers with an explanation of the conversion process, the secret code, the DN and the service activation or customer service number to dial for activating the new wireless unit. The DN can be the existing subscriber's phone number, the existing subscriber's phone number with added digits, a new phone number, or another identification number. In other embodiments, the DN for the first wireless communications system is provided and a new DN for the second wireless communications system.

At step 54, in response to the service provider's instructions, the subscriber goes to a store or authorized dealer of wireless units using the second radio standard, such as CDMA, to select a wireless unit supporting the second radio standard. The existing subscriber can receive the wireless unit supporting the second radio standard in alternative ways. For example, the service provider could send the wireless unit to the existing subscriber. The new wireless unit 55 (FIG. 1) has an ESN already programmed. Depending on the embodiment, the new wireless unit can have an IMSI already programmed or a dummy IMSI which is updated by the activation process. Alternatively, an IMSI is not programmed into the wireless unit at this point.

At step 56, the existing subscriber dials the service activation phone number using the new wireless unit 55 (FIG. 1), such as a CDMA wireless unit, to initiate an over the air service provisioning (OTASP) or service activation process. At step 58, the MSC 24 routs the call to the customer service center 38. To do so, the new wireless unit 55 registers with the MSC 20 or 24 using the ESN (and/or the IMSI depending on the embodiment) programmed into the new wireless unit 55 (FIG. 1). The new wireless unit 55 is shown as being in the region 14 of the home MSC 20 or the region 16 of the visitor MSC 24. In this embodiment, a voice connection is established through the PSTN 28 (FIG. 1) to the service call center 38 using the signaling network or wireless intelligent network 32 (FIG. 1) as would be understood by one of skill in the art to setup the voice connection to the customer service center 38 with the new wireless unit 55 (FIG. 1). Depending on the embodiment of the conversion/activation system, the voice connection to the customer service 38 can be established through the home MSC 20 and/or the visiting MSC 24.

Once the connection with the customer service center 38 is established, the activation process is initiated. In this embodiment, a determination 60 is made as to whether an automatic service activation procedure should be implemented. The activation process can make this determination by asking the existing subscriber whether they prefer automatic activation without speaking to an operator or whether they prefer to speak to an operator. If automatic activation is selected, the activation process asks the subscriber to enter the secret code and the DN at step 62. The subscriber enters the secret code and the DN at step 64. If the automated process is not to be used, a human operator at the customer service center 38 can ask the subscriber to enter the secret code and the DN at step 66, and the operator enters the secret code and the DN into the conversion process at step 68. In some embodiments, automatic activation for existing subscribers being converted may be the only option.

After the secret code and the DN is entered into the conversion system, the conversion system determines at step 70 if the secret code and DN entered by the subscriber corresponds to a proper secret code/DN pair stored in the conversion database. If so, at step 72, the information characteristic of the customer unit, such as the ESN and/or IMSI, of the new wireless unit is linked to the existing subscriber information from the subscription to the first wireless communications system and/or to the DN. For example, the ESN and/or IMSI can inserted in an appropriate storage field associated with the subscriber information obtained from the existing subscriber information of the first wireless communications system. The existing customer information can be stored in the conversion database then transferred to a subscriber database and/or the MSC (for the HLR and/or AC) of the second wireless communications system after being linked to the ESN and/or IMSI. Alternatively, the linking of the existing customer information and the wireless unit information can be performed at the subscriber database, and then the contents of the subscriber database associated with the converted subscriber is provided to the appropriate MSC (to the HLR and AC) or to any other databases or storage locations after, before or simultaneously with being provided to the MSC. In this embodiment, the customer profile from the existing subscriber information is already associated with the directory number (DN) for the new wireless phone. In other embodiments, for example if the mobile identification number used in the conversion system is not the DN, the DN for the new wireless unit will also need to be associated with the customer profile of the subscriber. Thus, using the existing subscriber information permits an easy transition for the existing subscriber to a second wireless communication systems because the interaction with the customer service 38 is reduced.

The conversion/activation system must program the new wireless unit with the DN assigned to the subscriber using known OTASP protocols using the OTAF 40. If the IMSI of the wireless unit 55 (FIG. 1) is to be updated, the OTASP protocols can be used to program the new IMSI into the new wireless unit 55. For the new wireless unit 55 to be activated in the wireless communications system using the second radio standard, the conversion/activation system sends an appropriate subscriber profile to the HLR 34, for example the HLR 34 through the home MSC 20, based on the DN assigned to the new wireless unit 55. Depending on the particular wireless communications system or embodiment, the appropriate subscriber profile or portions thereof can be sent to different databases, such as a stand-alone HLR (SHLR), the AC, a central database and/or databases distributed throughout the second wireless communications system for activating the new wireless unit. Different portions or forms of the existing subscriber information or profile can be sent to different storage or system locations. After the conversion/activation process is complete, the new wireless unit can be used by the subscriber on the second wireless communications system. If the DN used for the second wireless communications system is the same as the DN for the first wireless communications system, the old wireless unit is deactivated. If the DN for the second wireless communications system is different or if desired for other reasons, the second wireless communications system and/or the conversion system can send subscriber information to or initiate changes to the first wireless communications system based on the conversion of the existing subscribers to the second wireless communications system. For example, a call to the DN for the first wireless communications system can be forwarded to the new wireless unit on the second wireless communications system. Alternatively, the first wireless communications system can inform a party calling the old DN (of the first wireless communications system) of the called party's new DN on the second wireless communications system.

In addition to the embodiment described above, alternative configurations of the subscriber conversion system according to the principles of the present invention are possible which omit and/or add components and/or use variations or portions of the described system. The manner of transferring, copying, storing and/or sending existing subscriber information between and within the first and second wireless communication systems depends on the particular application. For example, the existing subscriber information can be stored in a variety of manners and locations, and once the existing subscriber information is transferred for use in converting the existing subscriber to the new wireless communications system, the manner in which the information is stored manipulated, augmented and deployed with the new wireless communications systems can also vary. Depending on the embodiment, components of the conversion system and the first and second communication systems converted between can be added, moved, changed or omitted. For example, the conversion system is described as converting an existing subscriber from a first wireless communications system (based on a first radio standard) to a second wireless communications system (based on a second radio standard), but the conversion can apply to upgrades and/or modifications to a first wireless communications system, thereby creating a second wireless communications system which uses a new wireless unit. The conversion process can be distributed at different locations throughout the converted wireless communication system and/or the wireless communications system being converted and occur or not occur at a single location therein. Additionally, the conversion process can transfer and/or modify existing subscriber information directly from the HLRs and/or subscriber databases of the first wireless communications system to the HLRs, conversion, subscriber and/or other databases of the second wireless communications system for converting and activating the new wireless unit.

As would be understood by one of ordinary skill in the art, the different forms and kinds of secret codes and information identified with the new wireless unit can be used in the conversion process to link or associate with existing subscriber information. For example, secret encryption and/or authentication keys may have to be associated with the second wireless unit in the HLR 34 and/or AC 35. Additionally, not all of the existing subscriber information stored in the first wireless communications system needs to be used transferred to the new wireless communications system. Moreover, the existing subscriber information can be modified or provided to the conversion system and/or the new wireless communications system in different form so long as the new subscriber information is derived from the existing subscriber information. Furthermore, the subscriber conversion system has been described using a particular configuration of functional components, but it should be understood that the subscriber conversion system can be implemented in different configurations and portions thereof can be implemented in application specific integrated circuits, software-driven processing circuitry, firmware or other arrangements of discrete components as would be understood by one of ordinary skill in the art with the benefit of this disclosure. What has been described is merely illustrative of the application of the principles of the present invention. Those skilled in the art will readily recognize that these and various other modifications, arrangements and methods can be made to the present invention without strictly following the exemplary applications illustrated and described herein and without departing from the spirit and scope of the present invention.

What is claimed is:

1. A method for converting a subscriber of a first wireless communication system to a second wireless communication system, a first wireless device associated with said first wireless communication system and a second wireless device associated with said second wireless communication system, said method comprising:

storing subscriber information relating to a subscription by said subscriber to said first wireless communication system;

assigning a code to said subscriber that associates said subscriber with said subscriber information;

receiving a request from said subscriber to activate said second wireless device;

prompting said subscriber to provide said code; and activating said second wireless device in said second wireless communication system using at least a portion of said subscriber information.

2. The method of claim 1, wherein prompting said subscriber to provide said code comprises prompting said subscriber to enter said code into said second wireless device.

3. The method of claim 1, wherein storing subscriber information relating to a subscription by said subscriber to said first wireless communication system comprises storing at least one of a mobile identification number, an international mobile subscriber number, a directory number and an electronic serial number.

4. The method of claim 1, wherein activating said second wireless device using at least a portion of said subscriber information comprises programming said second wireless device with at least one of a mobile identification number, an international mobile subscriber number and a directory number.

5. The method of claim 1, wherein storing subscriber information relating to a subscription by said subscriber to said first wireless communication system comprises storing at least billing information for said subscriber of said first wireless communications system.

6. The method of claim 1, wherein storing subscriber information relating to a subscription by said subscriber to said first wireless communication system comprises storing at least call features for said subscriber of said first wireless communications system.

7. The method of claim 1, wherein assigning a code to said subscriber that associates said subscriber with said subscriber information comprises assigning at least one directory number to associate said subscriber with said subscriber information.

8. The method of claim 1, further comprising the step of deactivating said first wireless device upon the activation of said second wireless device.

9. The method of claim 1, further comprising:

assigning said first wireless device a directory number; and assigning said second wireless device the same said directory number upon activation of said second wireless device in said second wireless communication system.

10. The method of claim 1, further comprising:

assigning a first directory number to said first wireless device;

assigning a second directory number to said second wireless device; and forwarding calls made to said first directory number to said second wireless device.

11. The method of claim 1, wherein said first wireless communication system uses a first radio standard and said second wireless communication system uses a second radio standard.

12. A method for converting a subscriber of a first wireless communication system to a second wireless communication system, said method comprising:

creating a first subscriber profile on a subscriber database, said subscriber profile including information relating to a subscription by said subscriber to said first wireless communication system;

assigning a subscriber code to said subscriber;

receiving a request from said subscriber to activate a wireless unit on said second wireless communication system, said wireless unit storing device information characteristic of said wireless unit;

prompting said subscriber to enter said subscriber code into said wireless unit;

receiving said subscriber code and said device information from said wireless unit; and generating a second subscriber profile based on said first subscriber profile and said device information, said second subscriber profile relating to a subscription by said subscriber to said second wireless communication system.

13. The method of claim 12, wherein said first subscriber profile comprises at least one of a mobile identification number, an international mobile subscriber number, a directory number and an electronic serial number.

14. The method of claim 12, wherein said first subscriber profile comprises at least one of billing information and subscription features for said subscription to said first wireless communication system.

15. The method of claim 12, wherein assigning a subscriber code to said subscriber comprises assigning a directory number to said subscriber.

16. The method of claim 12, wherein receiving said subscriber code and said device information from said wireless unit comprises receiving said subscriber code and at least one of a electronic serial number, a mobile identification number and an international mobile subscriber number from said wireless unit.

17. The method of claim 12, wherein prompting said subscriber to enter said subscriber code comprises the steps of:

providing said subscriber with a customer service number;

receiving a call on said customer service number from said subscriber; and initiating an automated activation process such that a machine-generated voice instructs said subscriber to enter said subscriber code.

18. The method of claim 12, further comprising sending at least a portion of the second subscriber profile to at least one of a home location register, an authentication center and a central database or databases distributed throughout the second wireless communication system.

19. The method of claim 12, further comprising programming said wireless unit with at least a portion of said second subscriber profile.

20. The method of claim 19, wherein programming said wireless unit with at least a portion of said second subscriber profile comprises programming said wireless unit using over the air programming protocols.

* * * * *